United States Patent
Le Moigne et al.

(10) Patent No.: US 7,853,687 B2
(45) Date of Patent: Dec. 14, 2010

(54) ACCESS CONTROL LIST GENERATION AND VALIDATION TOOL

(75) Inventors: Olivier Le Moigne, Ottawa (CA); Christopher Hawley, Mulgrave Victoria (AU)

(73) Assignee: Alcatel Lucent, Paris (FR)

( * ) Notice: Subject to any disclaimer, the term of this patent is extended or adjusted under 35 U.S.C. 154(b) by 450 days.

(21) Appl. No.: 11/713,732

(22) Filed: Mar. 5, 2007

(65) Prior Publication Data
US 2008/0222290 A1 Sep. 11, 2008

(51) Int. Cl.
*G06F 15/173* (2006.01)
(52) U.S. Cl. ................... 709/224; 709/229; 370/252; 726/6
(58) Field of Classification Search ............. 709/224, 709/229; 370/252; 726/6
See application file for complete search history.

(56) References Cited

U.S. PATENT DOCUMENTS

| 7,249,374 | B1 * | 7/2007 | Lear et al. ............... 726/6 |
| 7,586,851 | B2 * | 9/2009 | Panigrahy et al. ........ 370/252 |
| 2004/0260818 | A1 * | 12/2004 | Valois et al. .......... 709/229 |

* cited by examiner

*Primary Examiner*—Wing F Chan
*Assistant Examiner*—Ruolei Zong
(74) *Attorney, Agent, or Firm*—Kramer & Amado, P.C.

(57) ABSTRACT

This invention provides a tool for generating ACLs in an environment where a set of network elements or servers (e.g. web servers, IPTV servers, application servers ...) need to be secure. The tool also performs ACL validation to ensure that the filtering rules are correct before they are deployed in a network. The system enables a central view of the security configuration concerning the filtering rules in the network. Furthermore, it allows end-to-end configuration of the ACL rules, from the definition of the flows between the servers to the deployment of the rules on the network elements.

16 Claims, 5 Drawing Sheets

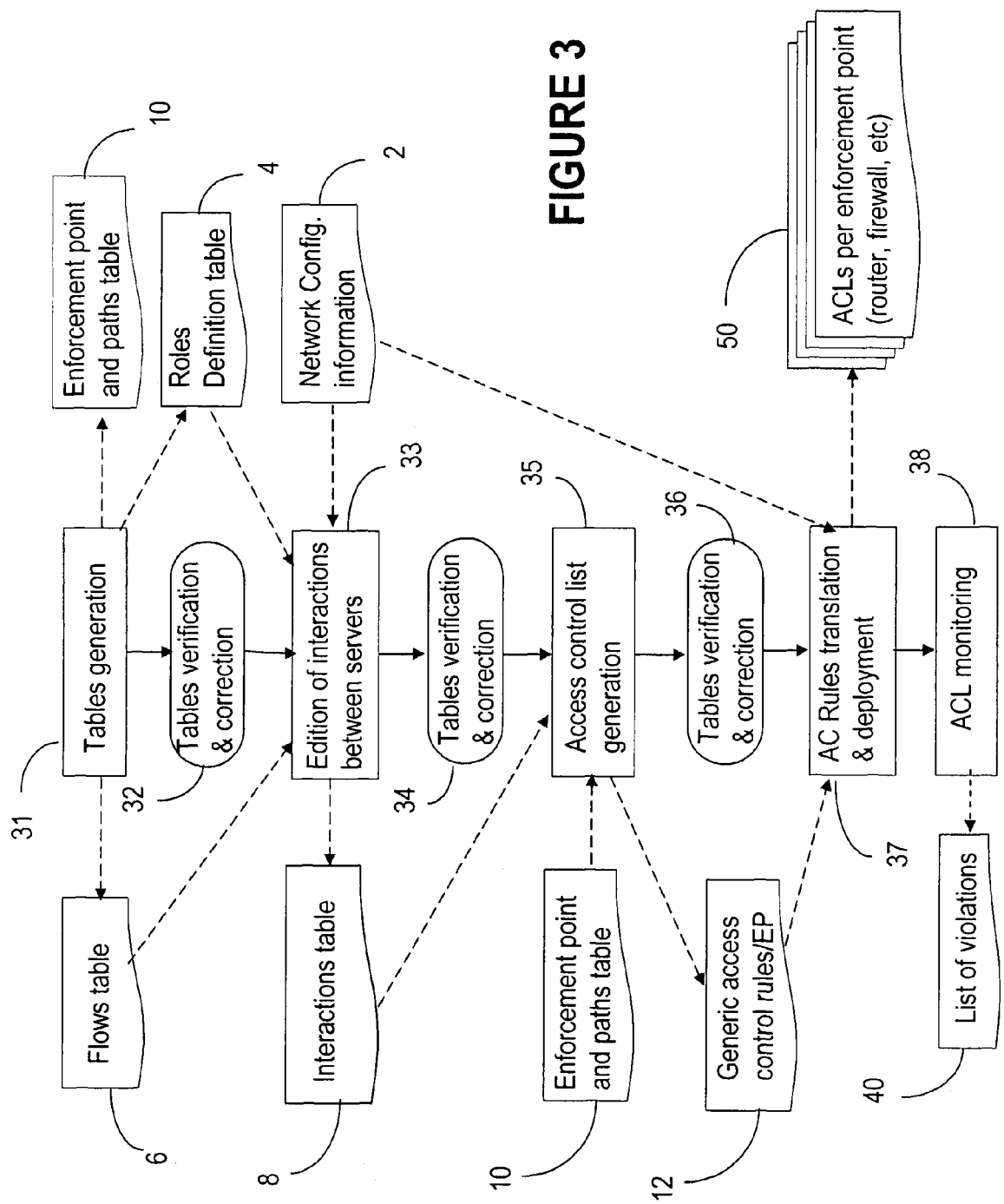

ACCESS CONTROL LIST GENERATION AND VALIDATION TOOL

FIELD OF THE INVENTION

The invention is directed to communication networks and in particular to access control list (ACL) generation, validation and monitoring system and method.

BACKGROUND OF THE INVENTION

Most network security systems operate by allowing selective use of services based on registration and/or subscriptions. An Access Control List (ACL) is the usual means by which access to, and denial of, services are controlled, by associating the services available with the hosts (users) permitted to use the service. An ACL also specifies, using control expressions, what access privileges users have to a respective service. For example, the ACL for use of a directory may specify the right to lookup, insert, delete, read, write, lock, or administer the files in the directory. The ACLs are attached to network objects such as services, servers, sub-networks, etc.

In general, there are two traditional models for setting access policies for resources, namely a "one-size-fits-all" approach, in which all resources are governed by the same access policy, and a "by-resource" approach, in which each resource is governed by a separate policy. The first approach is advantageous for a network manager, but it does not function well in a complex networking environment since different resources may have different access needs. The second approach is advantageous for the resources, because they can have individual policies applied to them depending on their specific requirements, but disadvantageous for the network administrator who cannot easily administer access policies for the network as a whole.

There are many other issues to be addressed by any access control scheme. Thus, there may be multiple levels of network administration and administrators within the network, which all must be synchronized to ensure that there is a consistent policy over the network as a whole. In addition, access authorizations to portions of a shared resource can be unique to each host, or many hosts may have identical groups or combinations of authorizations. Also, it is possible that a certain number of hosts will have similar privileges on the same resources.

Currently, the access control policies are configured manually, and the access of hosts to particular resources are implemented by an administrator. As the number of the shared resources and of resource users increases, generation and management of access authorizations, particularly when the network topology changes, becomes a very complex task. The process of manually editing entries in an extensive list is time consuming and is also subject to errors, often denying access to authorized users for an extended period of time, or, conversely, permitting access for an extended period of time after a desired termination of access authorization, while the changes are implemented. As well, errors such as failure to delete obsolete access authorizations tend to accumulate over time and compromise security of the system.

Access control schemes evolved with a view to making the administrator task easier. Thus, it is known to group resources with similar policies, based on types of accessing users, types of objects (resources), and organization structures. However, policies for different groups of resources and users cannot easily be related to one another, and they also tend to diverge over time, even in their common aspects. Furthermore, if the general policy for the entire network needs to be modified, the group policies must be individually changed. Therefore, while this approach achieves an intermediate level of granularity as compared to the one-size-fits-all and by-resource approaches, it is still not optimal.

There is a need for a system that provides a central view of the network security configuration concerning the filtering rules in the network. There is also a need for a system that allows end-to-end configuration of the ACLs, from the definition of the flows between the network servers to the deployment of the rules on the servers or like devices, with monitoring of the flows. As well, there is a need for an improved system for controlling access to network servers or like devices, especially in the Internet/intranet networking arena.

SUMMARY OF THE INVENTION

It is an object of the invention to provide an access control list (ACL) generation, validation and monitoring system and method for management of ACLs in an environment where network resources need to be secure.

Accordingly, the invention provides an access control list generation and validation system for deployment on network elements of a communication network, comprising: a tables generation unit for creating a flows table, a roles definition table and an enforcement points table; a tables management unit for creating an interaction table from the flows table and the roles definition table while validating data contained in the flows table, roles definition table and enforcement points table; an access control rules generation unit for generating generic access control rules for each enforcement point listed in the enforcement points table using the interaction table and the enforcement points table; and a rules translation and deployment unit for translating the generic access control rules into a format specific to each respective enforcement point and deploying access control rules having the specific format to the respective enforcement points.

The invention also provides a method for generating and validating access control lists before deployment on network elements of a communication network, comprising: logically dividing the network into subnets, a subnet including network elements communicating with each other without any enforcement between them; in each the subnet, grouping network elements into zones, the network elements in a zone being characterized by a common role and a common enforcement point, and each enforcement point being adapted to enforce specific access control rules on the traffic to and from the zone; identifying all flows within the network, a flow being defined by the protocol used between two roles; generating a flows table, a roles definition table and an enforcement points table; and validating accuracy of the flows table, roles definition table and enforcement points table based on network configuration information.

Advantageously, the system of the invention enables a central view of the security configuration concerning the access control (or filtering) rules in the network, while allowing end-to-end configuration of the ACLs from the definition of the flows between the servers to the deployment of the rules on the network elements. The invention also permits validation of the filtering rules before deployment, thus enabling any correction to be made before applying the rules.

Furthermore, the system of the invention enables automatic deployment of the rules on network elements (routers, firewalls, servers) and monitors continuously the flows to detect unauthorized traffic.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 illustrates operation of the system of the invention in the access control rules generation and validation mode;

DETAILED DESCRIPTION

Figure 1:
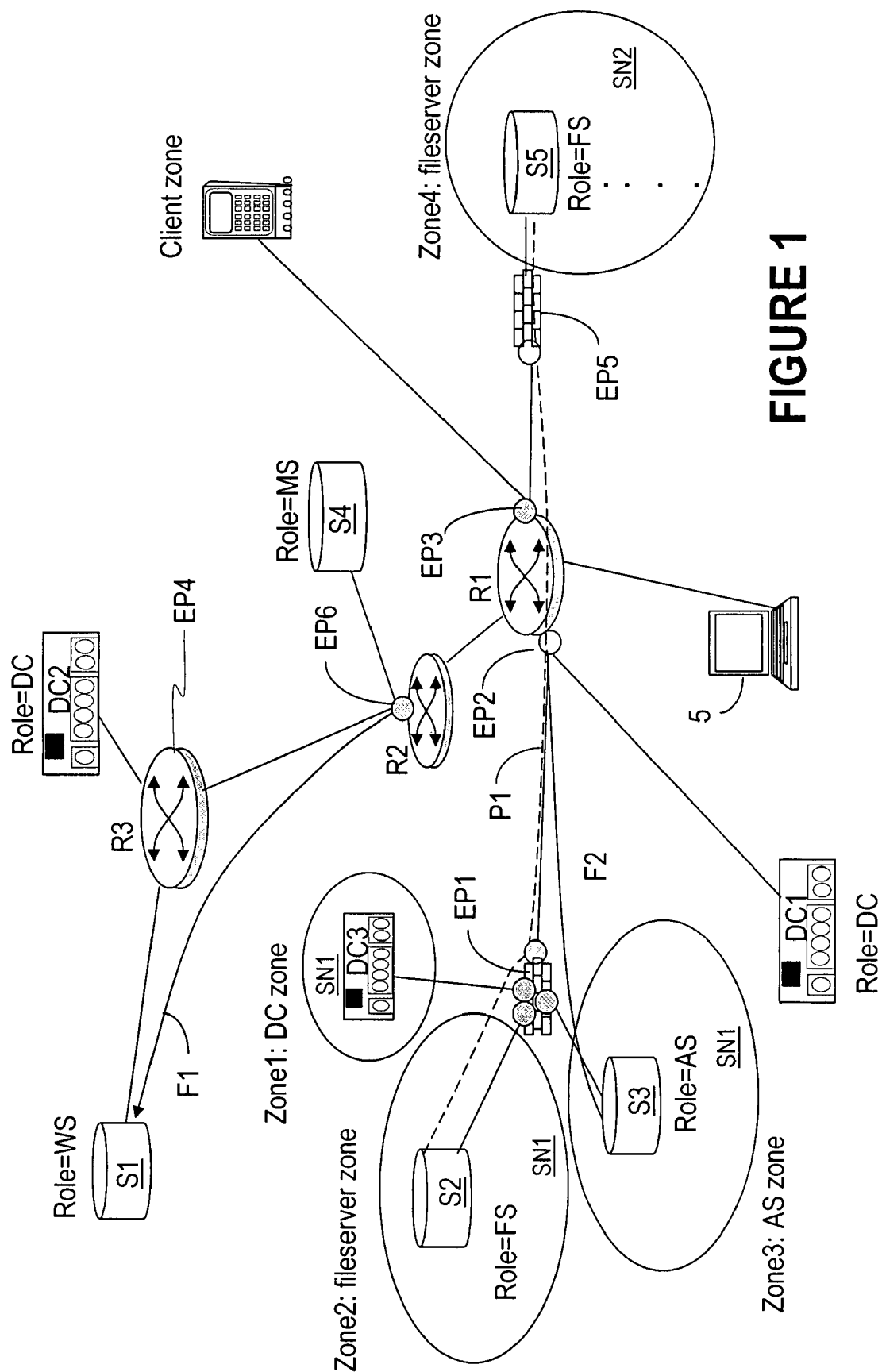
FIG. 1 shows a block diagram of an example of a network using the ACL generation and validation system of the invention.

In this specification, we use the following terms for defining the system according to the invention; these terms are described in connection with FIG. 1.

network element (NE) is used here to designate the equipment that is access protected. Examples of such network elements in the exemplary network of FIG. 1 are routers R1 to R3, servers S1 to S5, domain controllers DC1 to DC3.

role: a role defines a network element deployed in the network according to the type of operations that the respective network element can perform. Thus, a server is a network element (computer, device) which provides information or services to other network elements of a network. FIG. 1 shows a plurality of servers, each assuming a specific role. Thus, server S1 is a "web server (WS)", S3 is an "application server (AS)", S4 is a "mail server (MS)" and S5 is an "IPTV server". It is to be noted that a network element may have multiple roles. For example S1 may assume the role of a web server in some communications, but could also assume the roles of NTP Server, Domain Controller, and/or Virus Definition Server. The roles have requirements per interface or per a subnet that the respective server is on.

subnet: a sub-network (or a subnet) defines a segment of a network where hosts are connected without any enforcement between them; a typical example is a VLAN. Examples of subnets in FIG. 1 are SN1 and SN2.

zone: a zone is a grouping of NEs of a subnet according to a common behavior and a common enforcement point. For this invention, the common behavior is usually related to the security level. For example, a demilitarized zone (DMZ) is a zone of the network that contains all NEs that are exposed by their function to the open Internet (e.g. a Web server) and are therefore possible targets of attacks. By specifically protecting a zone, the impact of the attacks is limited as the servers in the zone are protected from the remainder of the internal infrastructure by strong security measures (e.g. firewalls). FIG. 1 illustrates three zones in subnet SN1, namely Zone1 comprising domain controllers, Zone2 including file servers and Zone3 including application servers.

flows: a flow defines a list of protocols used between two roles. Typically, for an IP network, a flow is defined by the protocol used for data communication (e.g. IP, ICMP, MPLS), protocol type (e.g. TCP, UDP for IP) and destination port. In the example of FIG. 1, the flow F1 between the router R2 and the server S1 uses the IP protocol, and the protocol type is TCP, i.e. the flow carries TCP messages. The flow denoted with F2 is established between the router R1 and the application server S3, and it carries IP traffic.

enforcement point: an enforcement point (EP) is a configuration provided to a router interface that enables enforcement of access rules. For example, enforcement points may be a data filter: router R1 is configured with enforcement points EP2 and EP3. Enforcement points may also be firewalls or intrusion prevention systems (IPS), as shown in FIG. 1 by points EP1 protecting subnet SN1 and EP5 protecting subnet SN2.

path: a path is defined by a list of enforcement points to be traversed by a flow between two zones. For example, path P1 shown in dotted lines on FIG. 1, is established between Zone4 and Zone2 and is defined by enforcement points EP1, EP2, EP3 and EP5.

interaction: an interaction is defined between two entities that communicate with each other. For example, an interaction may be defined by two servers, two roles and two subnets.

Figure 2:
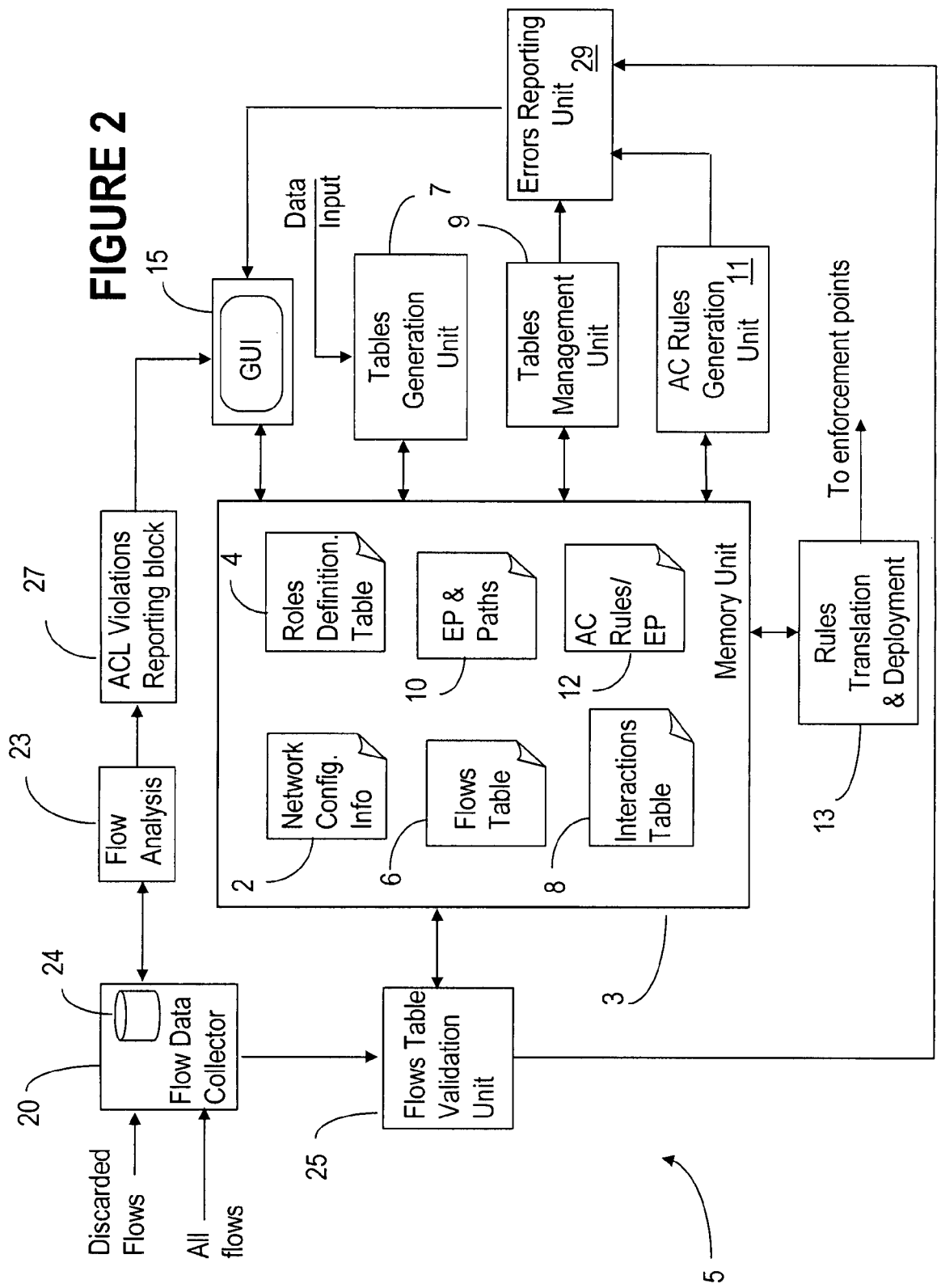
FIG. 2 shows a block diagram of an embodiment of ACL generation and validation system of the invention.

FIG. 2 shows a block diagram of the ACL generation, validation and monitoring system 5. System 5 comprises a memory unit 3, a tables generation unit 7, a tables management unit 9, an access control (AC) rules generation unit 11 and an error reporting unit 29. Rules generation unit 11 provides access control rules in generic format; therefore system 5 is provided with a rules translation and deployment unit 13 that translates the generic rules into specific AC rules.

Memory unit 3 generically illustrates the storage of the data used by system 5, organized in tables or lists. It is to be noted that the particular implementation of the memory unit is not the object of the invention, of relevance is the type of data stored. Thus, memory unit 3 stores network configuration information denoted with 2, a roles definition table 4, a flows table 6, an interactions table 8, an enforcement points and path table 10, and a file 12 with the generic access control (AC) rules for each enforcement point.

System 5 may also be equipped with a flow data collector 20 which collects information about the flows currently established within the network and stores this flow data in a local database 24. Flows collection is done using for example cflow, or syslog, provided on the EP interfaces to be configured with enforcement points (EP interfaces). These flow collection mechanisms are widely available and used at various network elements (routers, switches, firewalls) so no deployment of additional equipment is needed in the network.

System 5 may operate in an access control rules generation and validation mode, when the collector 20 collects real-time flow data obtained for all flows established in the network; this data is used for validating the flows table if desired. In this case, a flows table validation block 25 compares the flow data collected during the access control rules validation mode with the documented flow data stored in the flows table 6.

System 5 may also operate in a flow monitoring mode, when the collector 20 collects flows data only for the flows discarded by the network elements while enforcing the access control rules. In this mode of operation, a flow analysis unit 23 analyzes the discarded flows data with a view to identify the particular type of ACL violations, and an ACL violation reporting block prepares personalized reports for the operator.

The access control violations and the errors in the tables are reported separately (ACL violations by block 27 and errors in the tables by block 29) so that the operator may perform the respective corrections; any errors detected during rules generation are reported by error reporting unit 29 to enable their correction before rule deployment.

FIG. 2 also illustrates a GUI (graphical user interface) 15, which allows an operator to input flow data, enforcement point (EP) data and path data, and to view the violations reports. It is to be noted that this data may be input automatically, if the network elements are provided with interfaces capable of automatically providing this information.

As the name indicates, network configuration information 2 provides configuration information about the NEs for which the ACL lists should be generated and validated. While this information is not sourced locally, it is preferably stored locally in memory 3, or it could be cached locally for enabling access to respective configuration information when needed for confirming the data in the flow table and for generating the interactions table 8, as seen later.

Roles definition table 4 stores the roles of the network elements managed by system 5; as indicated above, a server may have multiple roles, which roles have requirements per interface or per a subnet that the respective server is on. The roles table 4 is generated by the tables generation and validation unit 7 using data input by the operator, and provides the various known roles of the NE's.

Flows table 6 provides an inventory of the flows between all the roles. The table is generated by unit 7 using lists of documented flow across the network as input by the operator or automatically collected from the network. Flows table 6 also uses data from the roles definition table 4. An example of a flow table is shown in the example below:

| Flows Table | | | | |
|---|---|---|---|---|
| Role1 | Role2 | Flow | SourcePort | DestPort |
| Web Server | Domain Controller | UDP | 122 | 135 |
| | | UDP | 123 | 230 |
| | | IP | 124 | 100 |
| Web Server | File server | TCP | 89 | 139 |

Tables generation unit 7 also generates enforcement points and paths list 10, which enumerates the documented flows at each enforcement point of the network. Table 10 is populated with the enforcement points and the paths between them manually (by the operator) or automatically, as desired. For example, an administrator could type these into the system at a low level, or if the NE has the proper interfaces and an import/export routine, they could be automatically gathered from configuration file data.

Tables management unit 9 uses the flows table 6 in conjunction with the roles table 4 and NE configuration data 2 for generating the interactions table 6. An example of the interactions table 6 is provided below:

| Interactions Table | | | | | |
|---|---|---|---|---|---|
| NE1 | Role | Snet | NE2 | Role | Snet |
| S1 | Web Server | | S2 | File Server | |
| | | | DC2 | Domain Controller | |
| | | | S3 | Application server | |
| S5 | File Server | SN3 | S2 | File Server | SN1 |
| | | | DC2 | Domain controller | SN2 |
| | | | S1 | Web server | SN2 |

Tables management unit 9 also verifies completeness of data in the flows table and enforces consistency of the data in the tables 6 and 8 with the NE configuration information 2. Additionally, for each interaction and flow, the presence of required pathing through enforcement points is confirmed and any errors are reported. In this way, errors in the tables are identified and reported by errors reporting unit 29 before they are processed by the ACL generation unit.

Still further, tables management unit 9 ensures consistency between the list of flows in the table 6 and the network elements configuration in table 2; consistency between flows and servers is enforced with a view to confirm that the interaction table is consistent with other data and that it is complete. For example, if a role Role1 communicates with role Role2 and Role3, a server of role Role1 has to have interactions defined with other servers of roles Role2 and Role3.

The AC rules generation unit 11 constructs the AC rules 12 for all enforcement points in the network, based on the interactions table 8 and the EP and path lists 10. As indicated above, the AC rules 12 are prepared in a generic format. The rules translation and deployment unit 13 performs translation of the rules from the generic format into specific formats used by respective network elements (more precisely by the respective enforcement points on the NE), using the network configuration information 2. Such translation mechanisms are widely available; for example the experimental embodiment of system 5 supports Alcatel 7750 SR and Cisco PIX syntaxes. Unit 13 also deploys the ACL rules to the enforcement points.

As indicated above, system 5 permits generation of filtering rules for deployment on network elements (equipment that needs to be access protected), validation of the filtering rules before deployment on network elements, deployment of the filtering rules on the network elements and monitoring for unauthorized traffic. This functionality is described next, with reference to FIGS. 3 to 5.

ACL Generation

FIG. 3 illustrates operation of the system 5 in the access control rules generation mode. In order to generate the filtering rules, system 5 prepares roles definition table 4 with the list of roles for each network element, flows table 6 with an inventory of flows between all the roles, and the enforcement point table 10, as discussed in connection with FIG. 2. Step 31 shows the generation of the tables 4, 6, and 10. These tables are populated by the operator using the GUI or are automatically prepared by the system if the NEs are equipped with interfaces capable of this functionality; this information is stored in memory unit 3.

Figure 4:
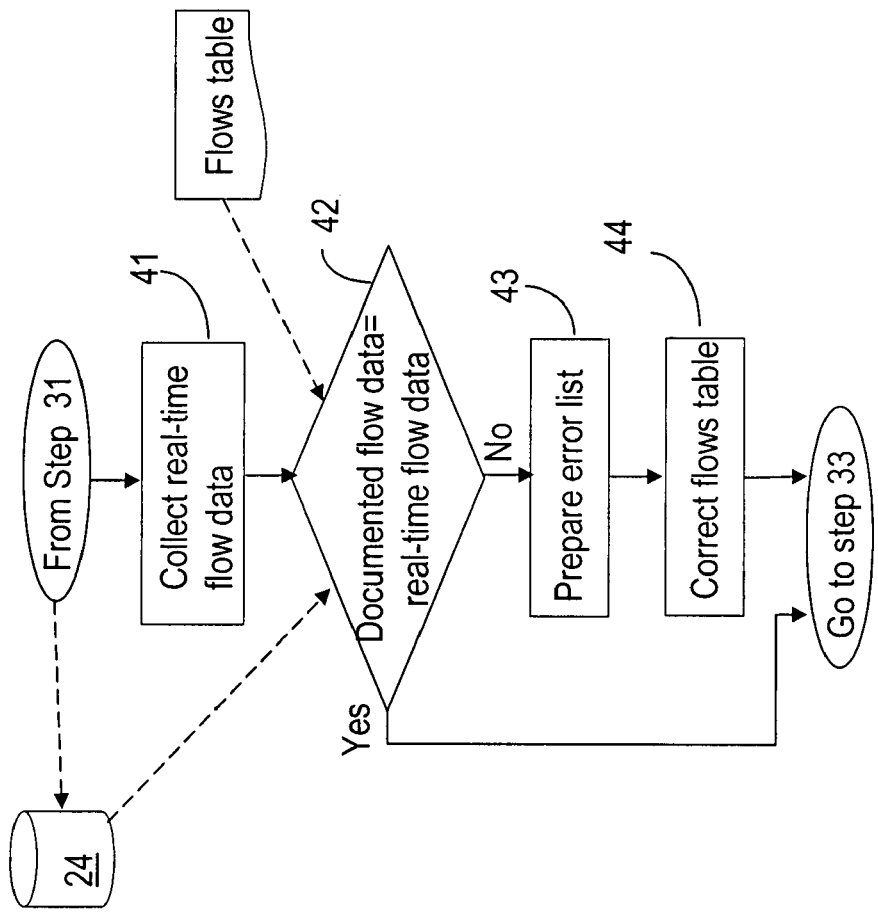
FIG. 4 shows validation of the flows table.

The flows table 6 is then validated by comparing the data in the table with data collected form the flows currently established in the network, shown in step 32, and described in further detail in connection with FIG. 4.

Based on the network configuration data 2, system 5 provides the mapping between the all pairs of roles and the flows between the respective pair in the form of interactions table 8, as shown in step 33. While constructing table 8, tables management unit 9 verifies completeness of data in the flow table and enforces consistency of the data in the tables 6 and 8 with the network configuration information 2. Additionally, for each interaction and flow, each path is confirmed based on the enforcement points and any errors are reported by error reporting unit 29 and corrected by e.g. the operator, shown in step 34.

The process of generating ACLs, shown in step 35, is performed by combining the information in the interactions table 8 with the information from the list of enforcement points and paths from table 10. The AC rules 12 are generated in a generic format at this stage, and provide the list with the particular rules that should be enforced on each enforcement points. Again, the system enables correction of any inconsistencies between the enforcement points table 10 and interactions table 8, as shown at step 36.

The ACL deployment is done by first translating the generic format used by the ACL rules 12 into vendor specific syntax and the configuration files 50 can now be downloaded on the enforcement points, as seen in step 37. The deployment is done by either directly executing these configuration files on the network elements or through an Element Manager Service (not shown).

After the configuration files 50 have been deployed, system 5 monitors the network for identifying any unauthorized access attempt, as shown in step 38 and described in connection with FIG. 6. A list 40 with the ACL violations is preferably provided.

Tables Validation

It is often not practical to deploy directly enforcement rules in a network without checking first that they will not prejudice the applications running on the network elements. The present invention validates the data used for generation of the access control rules at different stages. FIG. 4 illustrates flow table validation process, generally shown as step 32 on FIG. 3. As indicated in connection with FIG. 2, flow data collector 20 of system 5 enables collection of flow records from the network elements, step 41, and compares the flow information collected in database 24 with the list of flows stored in the flows table 6, as shown in step 42. Discrepancies between the real-time flow data and the flow data from the flow table are included in an error list, as shown in step 43. The error list is displayed on the GUI 15; this enables correction of the flow data in table 6, as shown in step 44.

Figure 5:
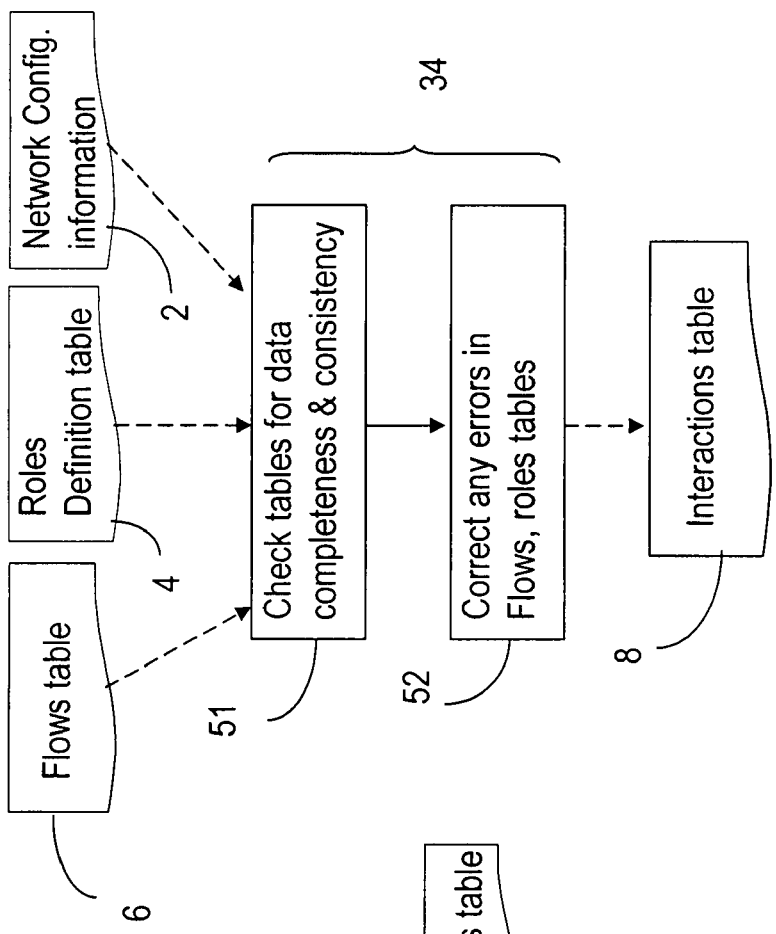
FIG. 5 illustrates validation of the roles table.

FIG. 5 is provided for illustrating the validation of flows and roles table, generally shown in step 34 on FIG. 3, in more detail. As indicated in connection with FIG. 3, the interaction table 8 is generated from the flows table 6, roles definition table 4 and network configuration information 2 to provide the interactions between the roles. Since the interaction table is constructed using the flows table, roles table and network configuration information, and the flows table has been already validated against current network configuration in step 32, any discrepancies between the roles and flow tables may be detected and corrected, as shown in steps 51 and 52.

Validation of the enforcement points table 10 and interactions table 8, shown in step 36 of FIG. 3 is performed in a similar way, by correcting any inconsistencies between these tables during the process of generation of the access control lists.

ACL Violation Monitoring

Figure 6:
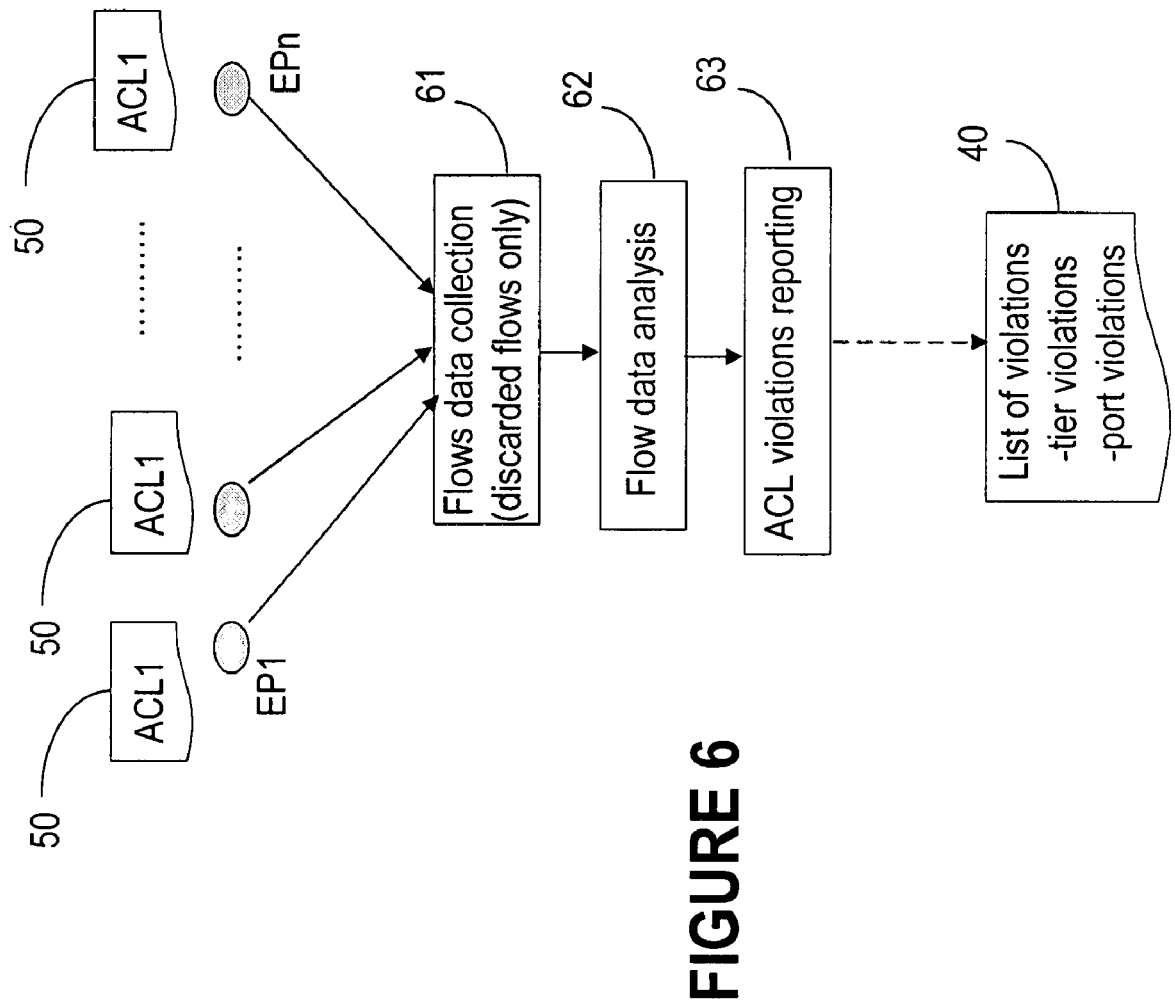
FIG. 6 illustrates operation of the system of the invention in the flow monitoring mode.

FIG. 6 shows operation of system 5 in the flow monitoring mode. At this stage, the flows that violate the ACL rules at the enforcement points are dropped; the flow data collector 20 collects now only the flows data from the dropped flows, as shown in step 61. This facilitates the on-going visibility of the effects of the newly-deployed ACLs. Flow data analysis performed in step 62 enables detection of flows that violate the access control rules deployed at the enforcement points, generically denoted with ACL 50.

Any violation of the ACL rules discovered at the enforcement points EP1 to EPn is reported by unit 27, as illustrated in step 63. The operator sees on the GUI 15 the list 40 with the violations. The violations are reported preferably into two main families: (a) tier violations, which report flows between subnets that should not communicate at all with each other; and (b) port violations, which report flows between subnets that are authorized to communicate, but use the wrong protocol, wrong port or other inconsistency with the flows documented in the flows table.

We claim:

1. An access control list generation and validation system that protects network computers of a communication network, the system comprising:
   a memory and a processor that executes security functions;
   a tables generation unit stored in the memory that creates a flows table, a roles definition table and an enforcement points table;
   a tables management unit stored in the memory that creates an interaction table from said flows table, said roles definition table, and network configuration information while validating data contained in said flows table, said roles definition table and said enforcement points table and validating accuracy of the interaction table against the network configuration information before deployment of access control lists;
   an access control rules generation unit stored in the memory that generates generic access control rules for each enforcement point listed in said enforcement points table using said interaction table and said enforcement points table; and
   a rules translation and deployment unit stored in the memory that translates said generic access control rules into a format specific to each respective enforcement point and deploys access control rules having said specific format to said respective enforcement points.

2. The system of claim 1, further comprising:
   a memory unit that stores said flows table, said roles definition table, said enforcement points table, and said interaction table.

3. The system of claim 1, further comprising:
   an errors reporting unit stored in the memory that reports errors detected in said flows table, said enforcement points table, and said interaction table.

4. The system of claim 1, wherein said flows table comprises a list of all documented flows within said communication network, each flow being defined by a protocol used for communication between two roles.

5. The system of claim 1, further comprising:
   a flow data collector stored in the memory of each network computer that operates in an access control rules generation mode, collecting real-time flow data obtained for all flows established in said communication network and a flow monitoring mode, collecting discarded flows data for flows discarded by said network computers.

6. The system of claim 5, further comprising:
   a flow analysis block stored in the memory that analyzes said flow data, and identifies access control violations; and
   an ACL violations reporting block stored in the memory that generates an AC rules violations list providing particulars of said access control violations.

7. The system of claim 5, further comprising:
   a flows table validation unit stored in the memory that compares real-time flow data with documented flow data stored in said flows table and identifies data errors in said flows table.

8. The system of claim 1, further comprising:
   a graphical user interface that enables input of documented flow data, roles data and enforcement point data respectively into said flows table, said roles definition table, and said enforcement points table, and displays errors detected in said flows table, said enforcement points table, and said interaction table.

9. A method, in an access control list (ACL) system, for generating and validating ACLs that protect network computers of a communication network, the method comprising:

using the ACL system to logically divide said communication network into subnets, a subnet including the network computers communicating with each other without any enforcement between them;

in each said subnet, using the ACL system to group the network computers into zones, the network computers in each zone being characterized by a common role and a common enforcement point, and each enforcement point enforcing specific access control rules on traffic to and from said zone;

using the ACL system to identify all flows within said communication network, each flow being defined by a protocol used between two different roles;

using the ACL system to generate a flows table, a roles definition table, and an enforcement points table;

using the ACL system to create an interaction table from said flows table, said roles definition table, and network configuration information while validating data contained in said flows table, said roles definition table, and said enforcement points table;

using the ACL system to generate generic access control rules for each enforcement point in said enforcement points table using said interaction table and said enforcement points table;

using the ACL system to validate accuracy of said flows table, said roles definition table, and said enforcement points table based on network configuration information; and using the ACL system to validate accuracy of the interaction table against the network configuration information before deployment of the ACLs.

10. The method of claim 9, wherein said roles definition table comprises a list of all roles that each network computer can assume during operation, each role being determined by operation types performed by said network computer.

11. The method of claim 9, wherein said flows table comprises a list of all documented flows within said communication network, each flow being defined by a protocol used for communication between two roles.

12. The method of claim 9, wherein said enforcement points table comprises a list of all documented flows at each enforcement point of said communication network and all paths between said zones.

13. The method of claim 9, further comprising:
   translating said generic access control rules into said specific access control rules and deploying said specific access control rules to respective enforcement points.

14. The method of claim 13, further comprising:
   monitoring flows discarded at each said enforcement point and generating a list with all ACL violations for identifying all flows that violate said specific access control rules.

15. The method of claim 14, wherein said list includes tier violations, which report flows between subnets that should not communicate at all with each other; and port violations, which report flows between subnets that are authorized to communicate, but use a wrong protocol, a wrong port or another inconsistency with flows documented in the flows table.

16. The method of claim 9, wherein said step of validating accuracy comprises:
   collecting real-time flow data for all flows established in said communication network;
   comparing said real-time flow data with documented flow data stored in said flows table for identifying errors in said flows table; and
   correcting said documented flow data in said flows table.

* * * * *

UNITED STATES PATENT AND TRADEMARK OFFICE
CERTIFICATE OF CORRECTION

| | | |
|---|---|---|
| PATENT NO. | : 7,853,687 B2 | Page 1 of 1 |
| APPLICATION NO. | : 11/713732 | |
| DATED | : December 14, 2010 | |
| INVENTOR(S) | : Olivier Le Moigne and Christopher Hawley | |

It is certified that error appears in the above-identified patent and that said Letters Patent is hereby corrected as shown below:

In column 8, lines 43 and 44, please delete "of each network computer."

Signed and Sealed this
First Day of February, 2011

David J. Kappos
*Director of the United States Patent and Trademark Office*

UNITED STATES PATENT AND TRADEMARK OFFICE
Certificate

Patent No. 7,853,687 B2                                                           Patented: December 14, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Olivier Le Moigne, Ottawa (CA); Christopher Hawley, Mulgrave Victoria (AU); and Benjamin Harden, Frisco, TX (US).

Signed and Sealed this Fifteenth Day of October 2013.

WING F. CHAN
*Supervisory Patent Examiner*
Art Unit 2441
Technology Center 2400